US007888568B2

(12) United States Patent
Kashioka

(10) Patent No.: US 7,888,568 B2
(45) Date of Patent: Feb. 15, 2011

(54) TIMPANI WITH QUICK, ACCURATE AND PROGRAMMABLE TUNING SYSTEM

(76) Inventor: Seiji Kashioka, 19743 Vista Hermosa Dr., Walnut, CA (US) 91789

(*) Notice: Subject to any disclaimer, the term of this patent is extended or adjusted under 35 U.S.C. 154(b) by 0 days.

(21) Appl. No.: 11/365,009

(22) Filed: Feb. 28, 2006

(65) Prior Publication Data

US 2007/0084328 A1 Apr. 19, 2007

Related U.S. Application Data

(60) Provisional application No. 60/727,414, filed on Oct. 17, 2005.

(51) Int. Cl.
*G01D 13/04* (2006.01)

(52) U.S. Cl. .............................. 84/41; 84/419; 84/602; 84/616

(58) Field of Classification Search ..................... 84/41, 84/453, 454, 487, 104, 33, 503–507, 723; 324/76.49; 334/3, 27; 335/94
See application file for complete search history.

(56) References Cited

U.S. PATENT DOCUMENTS 3,590,680 A * 7/1971 Carnes et al. ............ 84/411 R
3,732,476 A * 5/1973 Cairelli ...................... 388/838
3,747,463 A * 7/1973 Hinger ........................ 84/419
3,951,032 A * 4/1976 LaPorta et al. ................ 84/419
4,023,462 A * 5/1977 Denov et al. .................. 84/454
4,314,498 A * 2/1982 Hofstad ..................... 84/411 A
4,709,613 A * 12/1987 Powers et al. ................. 84/413
4,741,242 A * 5/1988 Aronstein ..................... 84/454
5,157,212 A * 10/1992 Fleming ...................... 84/413
5,270,475 A * 12/1993 Weiss et al. .................. 84/603
5,427,009 A * 6/1995 LaPlante ...................... 84/413
5,493,333 A * 2/1996 Hirose .................. 348/208.15
5,610,350 A * 3/1997 Miller ........................ 84/413
5,770,810 A * 6/1998 Lombardi ................. 84/411 R
5,877,440 A * 3/1999 Chaffee et al. ........... 84/411 M
6,281,420 B1 * 8/2001 Suzuki et al. ............ 84/477 R
6,307,133 B1 * 10/2001 May et al. ............... 84/411 M
6,326,539 B1 * 12/2001 Mishima ...................... 84/723
7,019,206 B2 * 3/2006 Mishima ...................... 84/723
7,138,574 B1 * 11/2006 Spinazzola ............... 84/411 R
2002/0184991 A1 * 12/2002 Brando ................. 84/411 R
2002/0184992 A1 * 12/2002 Brando ................. 84/411 R

* cited by examiner

*Primary Examiner*—Elvin G Enad
*Assistant Examiner*—Christopher Uhlir

(57) ABSTRACT

Timpani with quick and accurate tuning are shown. Each of timpani has a motor to drive the mechanism which gives variable tension to the head. Given tone is transformed to period of vibration and then to target displacement value of head rim against body. Motor is driven so that the head rim reaches the target displacement. Parameters of transform function to transform period to target displacement are stored, and updated, when head sounds and pair data of period of head vibration and the displacement are acquired, so that pair data fit the transform function. Combination of tones can be programmed stepwise in advance. In performance, steps are advanced by foot pedal or touch pad and tone changes of timpani are quickly done without sound. Muffling device is equipped and its actions are programmed with tone change.

22 Claims, 7 Drawing Sheets

TIMPANI WITH QUICK, ACCURATE AND PROGRAMMABLE TUNING SYSTEM

CROSS REFERENCE TO RELATED APPLICATIONS

This application is based on Provisional Application No. 60/727,414, filed Oct. 17, 2005.

BACKGROUND OF THE INVENTION

This invention is related to advanced timpani, or kettle-drum in another word, which are equipped with quick and accurate tuning system. It is also related muffling apparatus for timpani. And it is further related to new feature of tuning and muffling programming.

Timpano, singular form of "timpani" which is plural form, produces sound with clear pitch. A circular membrane called head covers a big kettle-like body. Rim of head is pressed to body by a hoop. In old time, six or eight hand screws around the hoop moved relative position of hoop to body, and then changed tension of the membrane. Player changed the pitch by adjusting the tension of membrane. It took time to adjust all six screws precisely for head to produce sound of required pitch tone. Until around year 1800, music composer had to compose under constraint of this matter when using timpani. It was common not to change the tone of timpani within one movement.

Then, improved timpani were invented, with which player could change pitch of timpani by rotating one clank handle. In other several inventions, pitch can be changed by angle of foot pedal. These motion links to up-down motion of a center shaft, and then the shaft links to six or eight points of the hoop. So, player could change the pitch with one point operation. It shortened the time required to change the pitch. But proficient player, who could adjust pitch with only foot pedal without listening the sound, was rare. Until today many players have operated pedal and listened to the sound, then corrected the pedal angle. With one or a few cycle of correcting operation, timpani is tuned to correct pitch. Player cannot make loud sound for adjusting the pitch; he must do it with very soft sound not audible to audience. Also, it takes 5 to 30 second depends on player's ability and surround sounds to adjust one timpano. According to these improvement, composers gradually composed music, in which timpani were changed tone in the course of music. But it is not so quick enough that they often use three or four timpani. Also, composers take care to give players enough no-play time for changing pitch of timpani.

Next improvement applied to timpani was attaching a tuning gage to each timpano. In one invention, up-down displacement of hoop was transformed to rotational angle of pointer. In other inventions, foot pedal angle or displacement of some mechanical point of link between foot pedal and hoop is transformed to rotational angle of pointer. In both mechanisms, there is a semi cylindrical bar aside of the pointer, and several sliding markers on the bar, which have characters of tone on them. Player can adjust head tension by observing that pointer comes to marker of desired tone. Positions of markers are precisely set before playing of the day. With these tuning gage, trained players can change tone within say two seconds.

If head is made of natural skin, its tension changes by humidity or temperature. So, even foot pedal or hoop displacement and pointer position do not change, pitch may vary per hour. Plastic head does not receive much effect from humidity. But, body of timpani or various parts of mechanisms may inflate with rise of temperature. As a result, it happens that pitch is shifted even pointer of tuning gage stays at the marker. Actually, top class players do not count on tuning gages. Instead, they adjust with their ears.

Nowadays, electronic tuning meters are available to musicians. They show the pitch of tone generated by every instrument including timpani. Furthermore, a few inventions (U.S. Pat. No. 4,741,242 and others) were accomplished for tuning meter dedicated to timpani. With these meters, not sounds of other instruments but only head vibration was picked up. They display nearest tone name and how much higher or lower the vibration is than the precise pitch. These means resolved the problem, which tuning gages had. And player without sharp ear is able to tune precisely. But, time necessary to adjust pitch does not decrease to less than five seconds, with these tuners or tuning meters. Because player has to produce sound by hitting the head and still need operation of feedback cycles.

With recent invention (U.S. Pat. No. 4,023,462), a motor drives the center shaft up and down, which pulls the head. This motor is driven according to difference between reference period of specified tone and measured period from vibration of head. The motor is driven until said period difference becomes to zero. Thus these form closed feedback loop, and automatic adjustment of pitch is realized. Time necessary to change tone may be in two second including time for pushing bottom to specify the tone and hitting the head.

Summarizing former technology described above; the tuning gage made quick tuning possible, but had problem of accuracy because of variation per hour. Precise tuning technology still asked hitting head. Anyway, it is not possible to change tone consecutively in say 0.2 second, as played with string instrument or trombone.

Four timpani are common in modern orchestra. Composers had to think this constraint. In case they still needed more tones in short time, additional timpani had to be prepared around player. Or they had to ask plural players to play on each set of timpani.

Player has to challenge muffling timpani, which is not well known. Player touches the head to cut off the tone. This action is called muffling. Correct muffling by hands is difficult technique itself Also, muffling is necessary to prevent sympathetic resonance of timpani, which are not hit. Especially, if there are three or more timpani arranged, it is difficult to muffle all the timpani with two hands. In invention U.S. Pat. No. 3,951,032, padded damping plates driven by electromagnetic device are touched heads according to foot switch operation. One foot switch can control all the timpani. But, to prevent sympathetic resonance, it is better to keep padded damping plates in touch status for timpani not use a little while. Until today to resolve this difficulty, just putting felt pads or something like on the heads of unused timpani is commonly used practice. But, in modern or contemporary works, selection of timpani to play on moves frequently, and then to move or take off the muffling felt pads are too cumbersome tasks.

BRIEF SUMMARY OF THE INVENTION

The first objective of this invention is to provide system for quick and precise timpani tuning without head vibration and without hitting the head.

The second objective of this invention is to provide system for timpani tuning, which keeps accuracy against varying humidity and temperature as well as elongation of the membrane.

The third objective of this invention is to provide system for timpani tuning without hand operation, so that it is possible to change tone of timpani while player plays on other timpani, or between two strikes on the same timpani. Additional objective is to change tones of plural timpani at once.

The forth objective of this invention is to maintain some function of pedal, such as glissando, or gradual shift of tone during roll, in the same time to realize other objective.

The fifth objective of this invention is to provide system for muffling aide. This means muffling not only after each hit, but also during tuning change and not in use.

In accordance to this invention, to accomplish the first objective, six means are added to conventional timpani. The first mean is a reversible motor, or actuator like it, for driving hoop up down. Motor rotation is stepped down and transformed to linear motion of center shaft connected to hoop, or transformed to angular motion of a hinge, which links pedal motion to the center shaft.

The second mean is a controller, which controls rotation of the motor. It controls direction, start and stop, and speed of the rotation. In case using pulse motor, it controls number of pulse to supply.

The third mean is displacement encoder, which shows the vertical displacement of the hoop giving tension to the head. That may be encoded directly at the hoop. Or linear or angular movement of some point of link in the driving mechanism from motor to hoop may be encoded. Further option is to encode cumulative rotation of the motor, or it may just counting pulses supplied to the motor in case it is a pulse motor. No matter which part is chosen to encode, directly or indirectly displacement of hoop is mapped onto some scale, and its value is autonomously updated and readable by the controller. With above described first, second and third means, displacement of any value within the possible range can be reached quick and precisely. It is common technique for positioning control.

The forth mean is curve memory for storing data representing the curve, and readable by the controller. Here "curve" means figure of graph of the displacement against period or frequency of head vibration. And examples of "data" are a set of point data on the curve, and parameters of mathematical function approximating the graph. These data are tuned preliminary to fit each actual combination of the head and the timpano.

The fifth mean is a console panel to receive the command and display status of each timpano.

When the console receive command to change tune to some tone, controller performs first transformation by calculating period or frequency of sound from the specified tone, and then performs second transformation using data stored in the curve memory, to get target displacement from the period or frequency. Then, drives the motor until encoded displacement reaches the target displacement.

Now, in case driving direction is loosening head, controller sets sub target to once pass the target displacement, and then switches the direction to approach the target. This is because friction between head and body retards head to shrink enough.

Thus, without hitting the head, fast as less than half second and precise adjustment of pitch is performed.

In accordance to this invention, to accomplish the second objective, the sixth mean, a period measuring device for head vibration, is added. This device may include microphone or set of optical emitter and detector set inside the kettle-like body. Picked up signals go through band pass filter, which passes signal component of frequency range the timpano can produce. Period of the wave signal can be measured by counting clock signal between two zero crossing of the signal. Measured data is taken into the controller. Also seventh mean, vibration detector, is added. This can be a threshold circuit comparing amplitude of picked up signal and pre-tuned fixed level.

When the special initializing process for this invention is ordered before concert or rehearsal, controller drives hoop to three positions, low, middle and high, prompts operator and waits operator's hit of head at each stop position. So, the controller gets three pairs of data, which are head vibration period and the displacement. Then, the controller calculates renewal parameters for the second transformation so that three pairs of data are on the curve of the transform function.

Thereafter, every sound played is detected by vibration detector, and pair data, taken from period measuring device and displacement encoder at that moment, are stored. Then, the controller checks if measured period is correct. If it is out of allowance, the controller calculates renewal parameters for the transform function, calculate target displacement with updated transform function, and drive the motor to reach the target. Player can make soft hit on the head before play after long rest for check purpose.

So, playing music itself maintains the accuracy of transform function and then tuning. So, affection from climate is compensated automatically and autonomously.

In accordance to this invention, to accomplish the third objective, the eighth mean of programming is added, which memorizes and reads out changes of tones in the sequence it happens in playing music. Before playing, changes of tone are input through console, step by step. They are stored in a tuning program memory of controller. Then, during the playing, player give the timing of change by foot switch, and the controller starts driving motors on the moment. All of two to five timpani arranged around a player are controlled all together in the same time.

Change in at least one timpano at some timing is memorized. Also changes of plural timpani in one timing also memorized as a group. Changes of group timpani start all together with one operation. Now, not only a foot switch, one or plural buttons or pads tapped by a finger or a mallet can be prepared to input timing. Also, especially for rehearsal, operation for skip or back in stepwise or fast mode to arbitrary position in the tuning program memory is also possible at the console. On the music sheet, print or display, this position information, that is step number and tone combination are written. Player can check if current program step or tones are correct or not, by compare written number on music and number in the console display.

With this mean, even player's two hands hold mallets and busy for playing, tone changes in a moment are possible. As consecutive changes of tone in say 0.2 second is possible with timpani of this invention, fewer timpani than ever can be enough for music works of past repertoire. On the other hand, composers can use timpani with far free frequent change tone than conventional ones. It is possible to play melody almost like trombone.

In accordance to this invention, to accomplish the forth objective, the ninth means is added to detect pushing force at toe and heel parts of pedal. The motor may be driven with speed according to the force detected there. Player feels this operation same as conventional pedal. And artistic expression about detail of glissando, such as timing and speed, is kept possible even it is motor driven.

In accordance to this invention, to accomplish the fifth objective, the tenth means of muffling apparatus consisting of soft pads, actuators to depress or release the soft pads to the head from inside the timpano, foot pedal input to actuate them. The eighth mean of programming can be expanded to specify if these soft pads staying depressed status or not.

Even hands are busy to play notes, complete muffling is possible with foot operation. Further there is no miss about inhibition of sympathetic resonance with programmed muffling.

DETAILED DESCRIPTION OF THE PREFERRED EMBODIMENT

Figure 1:
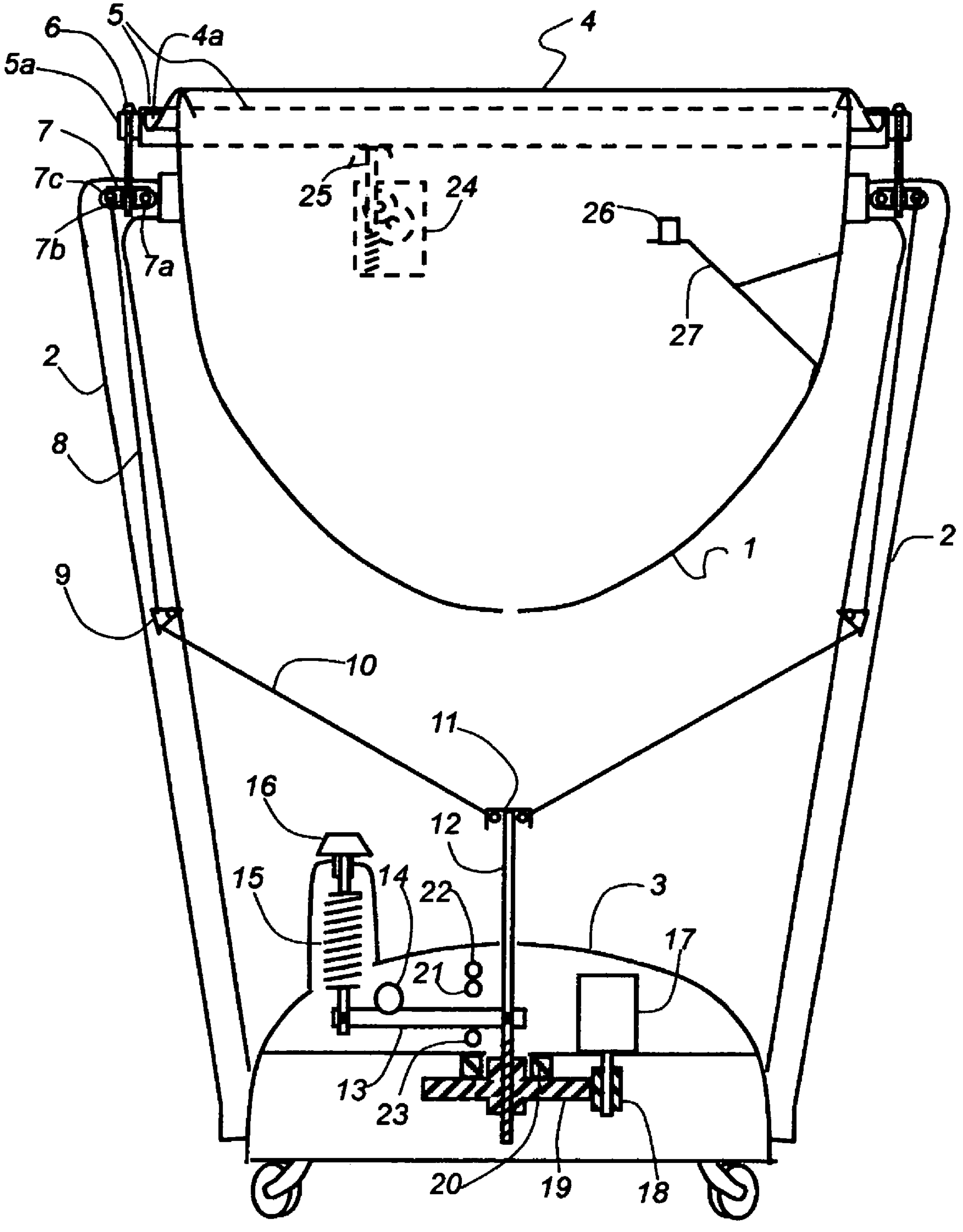
FIG. 1 is a cutaway view of timpano of the invention.

There are many variations to realize the invention. But, now referring to FIG. 1 to 5, one preferred embodiment of basic function is described. FIG. 1 shows cutaway view of timpano. It illustrates mechanism to change tension of head. Basic construction of timpani includes a body 1, six or eight legs 2 and a base piece 3 supporting the whole instrument, and a head 4 put on the body 1. A head is flexible membrane laps circular metal ring or rim 4*a*. Portion of head 4, which is inside of body 1, vibrates and makes sound triggered by hit with mallet. There is sharp major frequency in the sound spectrum it makes, so timpani are said to have definite pitch. The pitch is determined by diameter of body, mass density of head membrane, and tension applied to head. To tune the pitch to specific musical tone, modern timpani have mechanism to change the tension of head in reasonably short time.

Hoop 5 has L shape section and push down the ring 4*a*. Six or eight lugs 5*a* corresponding to legs 2 are attached to hoop 5, and bolts 6 connect each lug and mid point 7*b* of hinge 7. One end of the hinge 7*a* is fixed to leg 2. The other end of hinge 7*c* is connected to another hinge 9 by rod 8. Hinge 9 is connected to a center hinge 11 by another rod 10. Rods 10 and a hinge 11 form an umbrella like shape. Hinge 11 is fixed to center shaft 12. With these links, up down movement of center shaft 12 is reduced and transformed to up down movement of hoop 5 and head ring 4*a*. Tension of head 4 or its restoring force pulls up center shaft 12. On the other hand, hinge 13, supporting point 14, and counter balance spring 15 give pull down force to center shaft 12. The spring force can be adjusted by screw 16, which moves the upper end of spring 15. Said two forces, which pull up and down the center shaft, are nearly balanced. Mechanism described in this paragraph is typical in conventional timpani.

There are variations in mechanism. In some type, umbrella like rods 10 and hinge 12 are inside the body 1. Also there is some type, they are in the base 3. Still in other type, molded metal piece called crown is attached to the center shaft and pulls down hoop 5 through several rods. Common through these types is that there is a center shaft and up down of it causes hoop displacement.

In conventional timpani, center shaft 12 is connected to foot pedal with further hinge mechanism, or some cam mechanism. Player adjusts head tension by angle of foot pedal. Some type of conventional timpani has not counter balance spring 15, but have hinge lock mechanism operable by foot action with those types, which have counter balance spring 15, hoop keeps displacement by friction between body edge and head.

In this embodiment, an electric reversible motor 17 drives center shaft 12. Gears 18 and 19 reduce rotation of the motor. As lower part of center shaft 12 has screw thread cutting, rotation of gear 19 is transformed to up down motion of center shaft 12. Bearing 20 support gear 19 to base piece 3. There are three optical sensors, which detect coverage by hinge 13 in each optical axis. Sensor 21 detects the lowest tension of head 4 in usual use. Sensor 22 detects further lower or no tension of head 4, which is for head exchange purpose. Sensor 23 detects the highest limit of tension for protect head from break.

Displacement encoder 24 is installed outside the body, and a probe 25 is pushed up from inside of encoder. The probe always touches to bottom of hoop 5. Thus, displacement of head ring 4*a*, directly related to head tension, is measured. Resolution of 1 micrometer to 10 micrometer is suitable for the encoder 24. A microphone is set inside the body supported by bar 27. It picks up sound of head vibrations.

Figure 2:
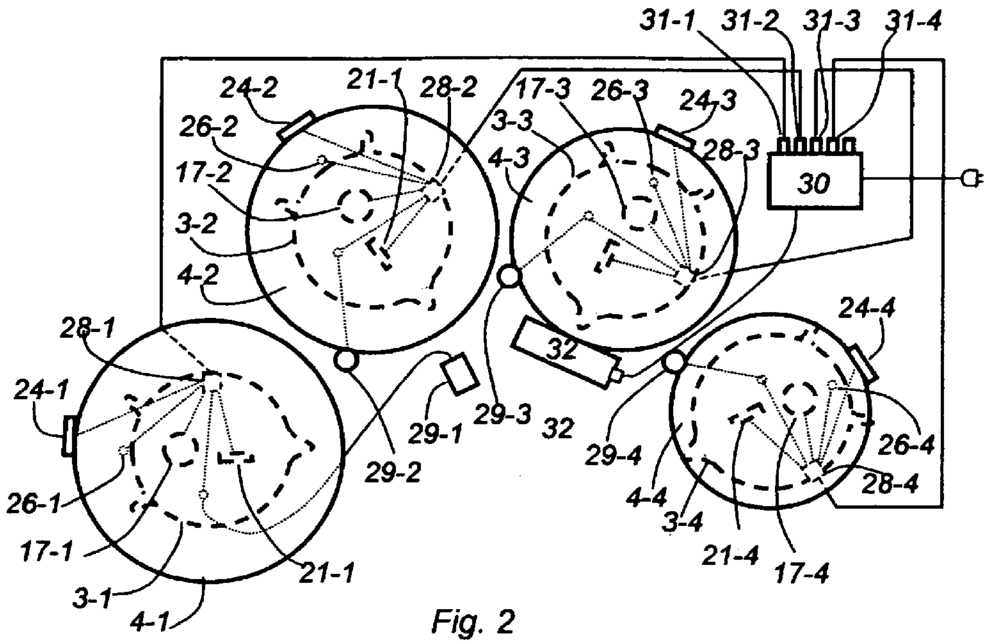
FIG. 2 is schematic diagram of four timpani set, showing electronic components and wiring between them.

FIG. 2 shows horizontal view of American style four timpani arrangement and also shows position of electric and electronic components relating to the control of pitches. In Europe, arrangement is reverse way, but it does not affect realization of this invention. Each component already shown in FIG. 1 is shown with branch number. 3-1, 3-2, 3-3, and 34 are base pieces usually in same size. 4-1, 4-2, 4-3 and 4-4 are heads, which diameters are 32", 29", 26", and 23". 17-1, 17-2, 17-3, and 17-4 are motors. 21-1, 21-2, 21-3 and 21-4 are sensors for lowest tension point. Sensors 22 for release points and 23 for highest tension limit are omitted from FIG. 2, but they are at the same position with sensor 21. 24-1, 24-2, 24-3 and 24-4 are displacement encoders. 26-1, 26-2, 26-3 and 26-4 are microphones.

Now, there are system components not written in FIG. 1. Wires from or to above components are once connected to connectors 28-1, 28-2, 28-3 and 28-4. There is a controller 30 contains microcomputers and plug-ins 31 -1, 31-2, 31-3 and 31-4, which are corresponding to each timpano. If only two timpani are at some site, only two plug-ins are enough for system. Corresponding plug-in 31 and connector 28 are connected with one bound wire. There is a foot pedal 29-1, which generates just on-off signal, connected to one of the timpani. There may be small electronic touch sensitive pads 29-2, 29-3 and 29-4. Number of electronic pads may be chosen as zero to the same number of timpani. Pads are clipped to hoop at any position. But it is better to position along the path of mallet movement. They can be hit by mallet or finger, and tell the system timing of tone change. One console panel 32 is essential to the system. It is put on in front of one center side timpano.

Figure 3:
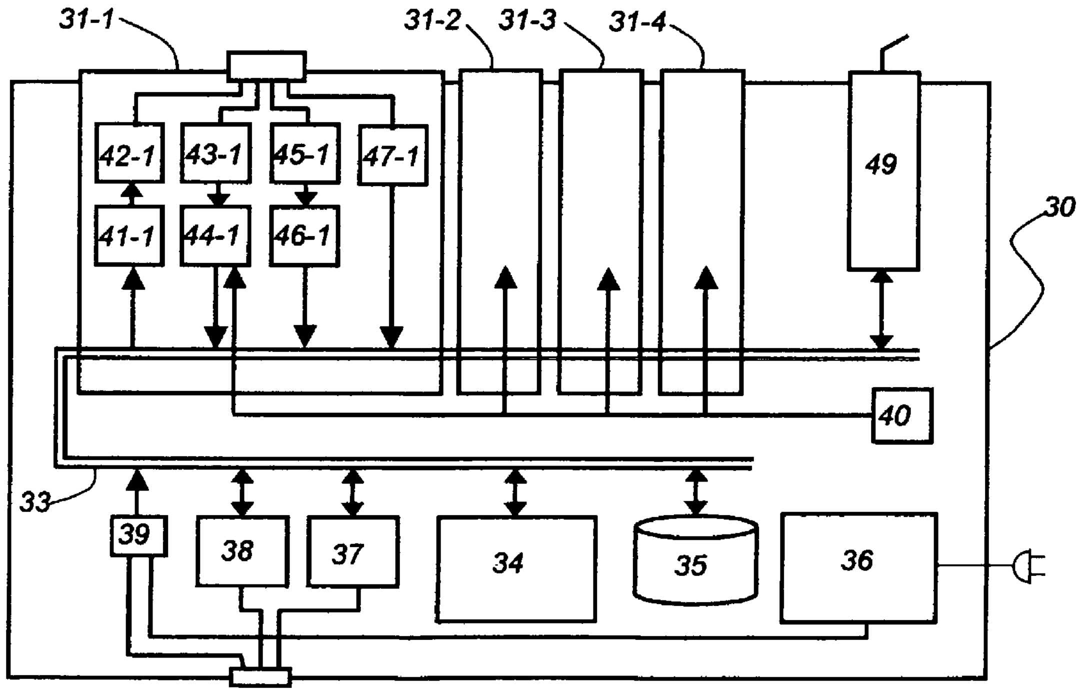
FIG. 3 is schematic diagram of a controller.

FIG. 3 is a schematic diagram of controller 30. It is like a desktop personal computer composition. Plug-in 31 are connected to system bus 33. There are a microprocessor 34, a hard disk 35, a power unit 36, as well as a display control unit

37, a touch panel input adapter 38, and power switch interface 39. There is a clock pulse generator of 1 MHz 40, and deliver the clock to every plug-ins 31.

Each plug-in has four sections. Only one plug-in is detailed in FIG. 3, but others have same composition with 31-1. First, motor drive section has motor speed register 41-1. The sign bit specify the direction of rotation, and other bits specify the target speed of motor 17-1. Speed value is digital to analog converted, and power amplified in 41-2 circuit.

Second section is for detection of vibration period. Signal from microphone 17-1 is received by circuit 43-1 for band pass filtering and detection of zero crossing. With band pass filtering, only base tone of the timpani, which has frequency range of 70 Hz to 260 Hz, gets through. Also, 43-1 has detector of amplitude. Only when amplitude is larger than certain threshold, a flag is set to on, and the zero crossing signals go through. Two zero crossing signals per one cycle go to period counter 44-1, transfer the count value to output register, and reset the counter. Counter always counts 1 MHz clock 40. On flag signal and Zero crossing signal also initiate interrupt procedure, and micro processor 34 takes in value of the output register and reset the interrupt.

Two channel signals come in from displacement sensor 24-1 to the third section. Signals are read from two 0/1 patterns on a rotary disk driven by up down motion of the prove, which are sifted a quarter cycle. Every 0-to-1 and 1-to-0 edge timing is fed to counter 46-1 as up or down count pulse depending on the other channel signal. This is known method for encoding of two-way movement. Counter 46-1 always shows current hoop displacement, and can be read from microprocessor 34.

In the forth section, status register 47-1 reflects value of sensor 21-1, 21-2, 21-3, and foot pedal or electronic pad 29-1. Signal changes in these sensors cause interrupt. Status includes setting of digi-switches set according to diameter of timpani.

Other than plug ins, display control unit 37 is for liquid crystal display panel on the console panel 32. Touch panel input adapter 38 is also for the console panel 32. These are general one and not described here. Also, LAN adapter 49 is general one.

Figure 4:
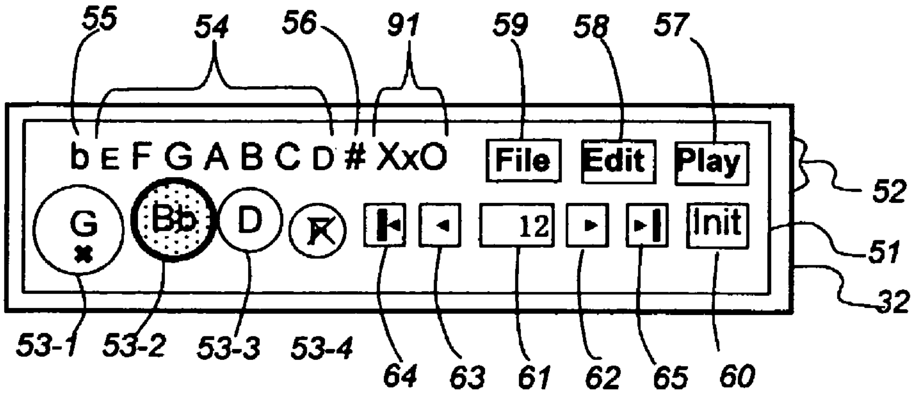
FIG. 4 is an example of console panel.

FIG. 4 shows an example of console panel 32. It is a box with a liquid crystal display 51 covered with a transparent touch panel. Power switch 52 for system is on the side of box. Sample of display image contents at some moment is shown here. Four timpani are shown with circles 53-1, 53-2, 53-3 and 53-4. Now, 53-2 is displayed with bold line showing selected for operation. Tones set to each timpani are shown with alphabet character inside of each circle, some followed by flat or sharp symbol. Alphabet characters 54 and flat and sharp symbols 55 and 56 are displayed above the four circles. Character set depends on selected timpano and telling available tones on selected timpano. To change tone, first select timpano by touch the circle 53, if other one has been selected. Next, touch flat or sharp symbol 55 or 56, if necessary. Then, touch one of character 54. Controller immediately starts driving the motor. With this operation one by one instruction can be given on demand, and it works if there is enough time for player to change tones.

For case there is no time to operate on console panel, or very busy frequent changes are necessary, programming function is usable. There are three modes in the console operation of timpani of this invention, which are Play, Edit, and File. Touching respective pseudo button 57, 58 and 59 in the display change mode to corresponding mode.

Now, edit mode operation is described. Play mode and edit mode use same display as shown in FIG. 4. In edit mode, motors are not actuated. Setting for tones of four timpani are grouped and memorized in a program step, which has a sequence number named program step number. With pushing initialize button 60, all tuning program memory contents are cleared and program step number becomes 1. Program step number is shown on the display at 61. At step 1, tones of all timpani must be specified. Specifying operation is same as in play mode, that is, selection of timpano, specifying flat or sharp if needed, and selection of tone, in this sequence. Character display changes for the timpano by this operation. Pushing forward button 62 demands group setting is confirmed and stored into tuning program memory and program step goes up by one. At next step specification is necessary for only timpani need change tones. For convenience, there are backward button 63, rewind button 64, and go-to-end button 65, to navigate through steps.

File mode is used to store or load tuning program or memorized steps to or from secondary memory. Display contents are different from FIG. 4 and are some appropriate for navigation through file systems to locate the file place, as seen in many application software. Player can use portable memory to save and reuse program step memories. It may be downloaded through wired or wireless LAN.

Now, play mode operation is described. Hereunder controller means the microprocessor 34 and its programs. In play mode, selected timpano is tuned to specified tone right after touching any of character 54. Also, touching forward button 62 or more likely stepping on foot button 29-1, or hitting any of electronic pads 29, causes advance of program step. As soon as program step advances, motion start at the timpani, which are specified to change tones.

Touching initialize button 60 in play mode activates initial data acquisition procedure for all the timpani one by one. This is a kind of ritual for player to start use of timpani. Using sensor 21, controller drives the motor to move the hinge 13 to the sensor position, means position where sensor signal changes, and head tension is at the lowest. Controller pulls down center shaft certain distance. Then make timpano circle 53 on the display blinking and wait player to hit the head. When microphone picks up head sound and amplitude detector set flag on. Microprocessor gets a few pair data from period counter 44, and displacement encoder 46, stores the data and stops blinking on display. Then it drives motor to pull down center shaft certain distance and again make circle display blinking again to ask player to hit the head. Repeat this procedure a few preset times to get pair data of period counter 44 and displacement encoder 46. It is not necessary that pitch be in tune. After controller finishes the procedure on a timpano, it goes to next timpano.

Figure 5:
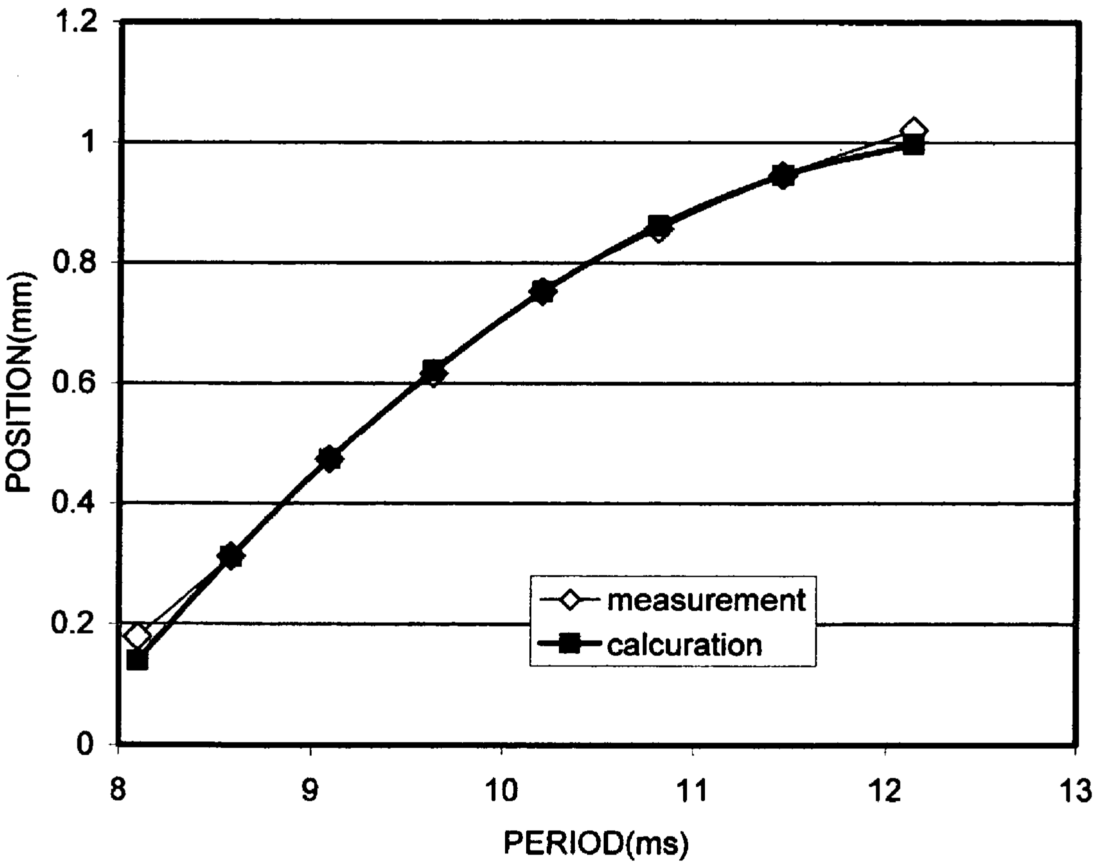
FIG. 5 is an example graph showing the relation between vibration period and hoop displacement.

FIG. 5 shows an example of curves of displacement of hoop against period of vibration. Thinner line curve shows an example of real data gotten from a timpano, and thicker line curve shows calculated according to transform function adjusted to fit the real data. In this example, second order polynomial is used as transform function. For this transform function three pairs of data can determine three parameters, two coefficients and constant term. It seems the transform function is well fit the real data. So, initial data acquisition described above is done with three data for each timpano. For example in FIG. 5, if sensor point is at 1.0 mm, displacement at 0.9 mm, 0.6 mm and 0.3 mm are used for initial data acquisition. Their pitches are not necessary to be some tone in the music scale.

Interpolation or extrapolation is one of other calculation method. More sophisticated transform function may be used for more precise fit in all the range, but need more pairs of data to determine the parameter in the transform function.

Frequency of each tone can be calculated using logarithm function, supposed equally tempered scale is used, and frequency of A4 is given as 440 Hz or other value. Then period of sound wave is calculated as inverse of frequency. Controller keeps these periods value multiplied by one million as target value, as this system uses 1 MHz clock. Actually, to avoid heavy calculation of logarithm, all possible values of period can be calculated off-line, and memorized in a table format.

To tune a timpano to certain tone, controller at first gets the period value corresponding to the tone from said table, and at second calculates target displacement by substitution of period value to the transform function. Then drives the motor 17 until actual displacement reaches said target displacement In case going up, in other word loosening head, controller once drive the motor so that hoop goes certain amount higher than target, then pull down it to the target displacement. When it approaches to target, controller sets motor speed depending on the distance between current and target displacement for fast and accurate positioning. There may be maximum and minimum speed to drive the motor. Also, there are many studies on optimal control for each type of motor used to do this movement fast and accurately.

In play mode, every hit at head makes vibration of head, and it is picked up by microphone 26, then amplitude detector set flag on and period counter 44 gets count value. Microprocessor takes in the count value, accumulates several data to calculate mean value, and compares it with correct period of specified tone. If the difference is bigger than predetermined allowance, correction procedure is activated. Microprocessor reads displacement counter 46, makes pair with period data and stores them. Microprocessor picks up latest three such pair data and calculates parameters for revised transform function in same way as initialize procedure. Then it calculates the new target displacement value with updated function from period of specified tone, drives the motor until hoop reaches newly calculated displacement. So, correction is autonomous, even climate change affects tension of head.

Player can plan use of timpani and tone changes for each music work preliminary. Player can assign step number to changing point and write it at the point on the music sheets with special mark for program step advance. This special mark is put on the music staff in the same way with note, so that player can precisely set the timing of tone changes among condense notes. It is like pedal mark in piano music. Player inputs the tones of each timpano for steps in edit mode. Then, during playing music, when timing comes to written changing point with mark, player just operates on any of foot switch or electronic pads 29. It changes all or some timpani in a moment.

Player can save the memorized steps information into some removable disk for next time to play the work. Publisher may provide music sheet with program step information, which are marks and tone combinations, written on it. Further more they may provide digital disk contains the step information to be loaded onto timpani of this invention. There may be several versions corresponding to timpani set, number and sizes. Player can load one of those files into controller in file mode and use it in play mode looking provided music sheets. Player can modify program step information in edit mode.

Figure 6:
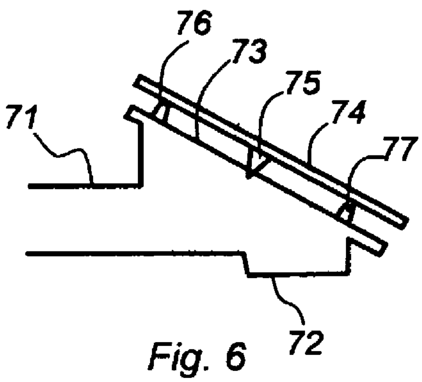
FIG. 6 is an example of pedal with censors.
Figure 7:
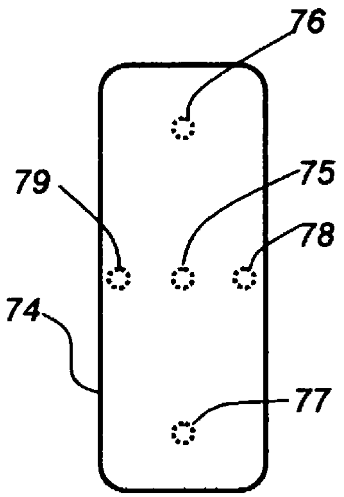
FIG. 7 is arrangement of censors.
Figure 8:
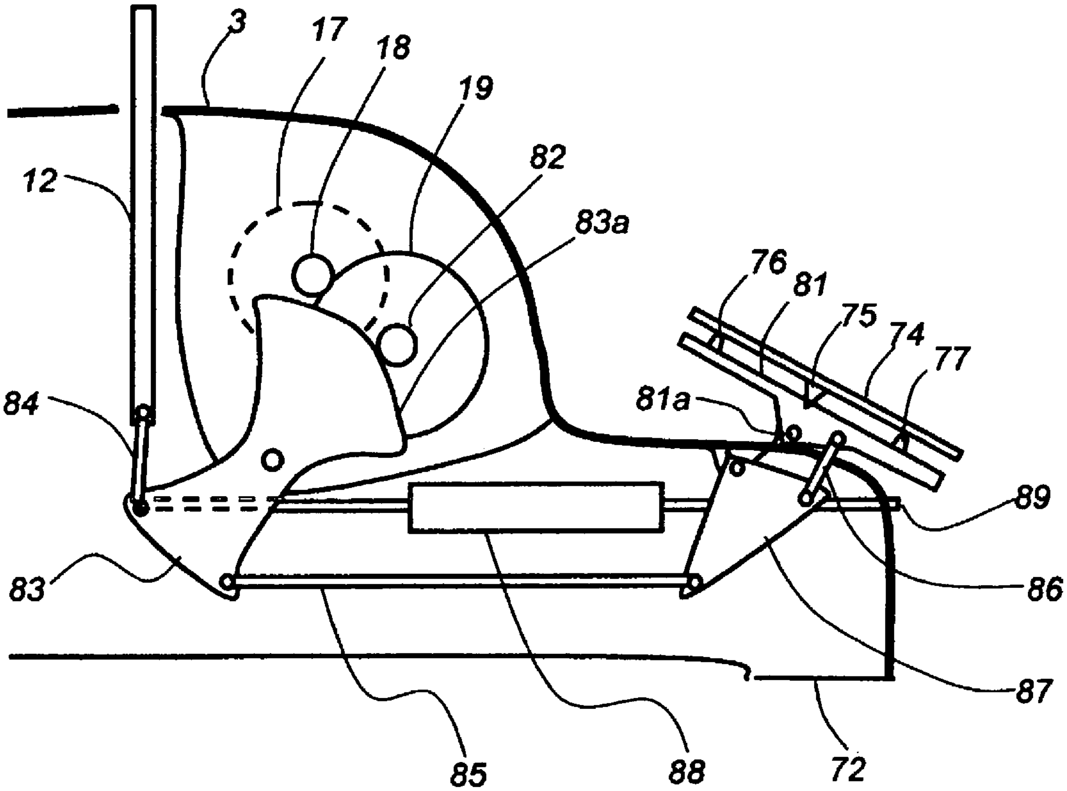
FIG. 8 is an example of bilateral control mechanism.

Now supporting feature for pedal operation referring to FIGS. 6, 7, and 8 is described. There are two types of embodiments that are one-directional and bilateral. FIG. 6 shows a pedal for an example of one directional type control. A jut 71 is a part of base piece 3. A leg 72 is one of bearing points of whole instrument. Therefore, back pedal plate 73 is unmoving. But, pedal plate 74 is able to tilt to any direction. There is one rigid pin 75 at the center, which supports pedal plate 74. FIG. 7 shows sensor arrangement in the pedal plate 74. Toe push sensor unit 76 and heel sensor unit 77 have springs in them and push back pedal plate 74. Both sensor units have some allowance and produce signals according to pushing pressure when pushed over the allowance. Hold switch unit 78 and release switch unit 79 are momentum switches, which have nodding action for operator's awareness of its action. Both switch units have springs pushing back pedal plate 74. When foot is not on the pedal, the pedal plate 74 is parallel to back pedal plate 73.

With these input devices, player can accomplish pedal operation like conventional timpani. When toe push sensor 76 detects pressure, its signal is sent to one of plug-in 31 in controller 30. Microprocessor 34 takes in the signal and drives the motor 17 with speed according to sensed pressure on toe push sensor 76 to direction pulling down the center shaft 12. Thus player can make quick glissando by pushing strongly with toe, as well as gradual pitch uplift by pushing softly. When heel push sensor 77 detects pressure, motor 17 is driven to direction pushing up the center shaft 12. It makes quick or slow pitch down.

If hold switch 78 stays off and head vibration is diminished and amplitude encoder is set off, microprocessor 34 drive the motor 17 so that head goes back to original displacement. When hold switch 78 is turned on, microprocessor 34 stops driving motor 17 and hold the position. This hold continues until release switch 79 is turned on, or one of foot button or electronic pads 29 is hit for changing tones.

FIG. 8 shows bilateral type of embodiment of pedal control. Back pedal plate 81 tilts around a pin 81*a* Pedal plate 74, rigid pin 75, toe push sensor unit 76, heel push sensor unit 77, hold switch unit 78, release switch unit 79 are the same components with those in the previous described embodiment. And, control driven by these sensors and switches also the same with the previously described embodiment. The difference with the previous described embodiment is that motor 17, gears 18 and 19, transform their rotation to gear portion 83*a* of hinge 83, and that hinge is linked to the center shaft 12 by link 84. Also, hinge rotation is transformed to the tilt movement of back pedal plate 81 and pedal plate 74, by links 85, 86 and hinge 87. Thus, feeling of pedal operation is like conventional timpani. But player can operate with less power. There is counter balance tension spring 88 and adjusting screw 89.

In case there is no power supply and motor 17 does not work, pedal plate 74 can be used to drive the center shaft 12 as in conventional timpani. There may be crutch between motor 17 and gear 83*a* to reduce the back load of pedal operation during power off.

Figure 9:
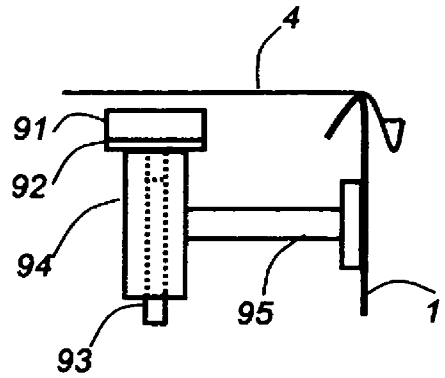
FIG. 9 is an example of a muffling apparatus.
Figure 10:
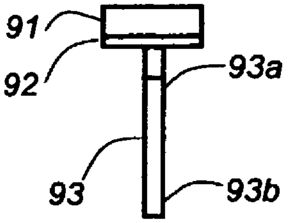
FIG. 10 is a shifting unit in muffling apparatus.
Figure 11:
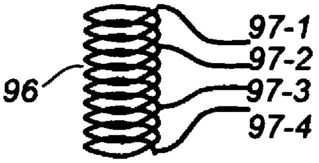
FIG. 11 is a solenoid in muffling apparatus.

Muffling aide is described here using FIG. 9 to FIG. 14. With this embodiment, muffling felt pad 91 is installed inside timpano body 1. As shown in FIG. 10, felt pad 91 is pasted on the plastic plate and rod 92. Plate and rod are made of material, which is not magnetized. Bottom of rod 92 is attached to magnet rod 93. Magnet rod 93 is permanently magnetized as one end 93*a* is N pole and another end 93*b* is S pole. A magnetic coil 96 is hold inside housing 94, which is positioned by an arm 95 attached to the body 1. As seen in FIG. 11, four lead wires 97-1, 97-2, 97-3, and 97-4 are connected to the coil 96. Electric current is given two ways. One is between 97-2 and 974, and the other is between 97-1 and 97-3. Each generates magnetic field at lower and higher position. In both case, top side of coil becomes S pole and pull the N pole 93*a* of the magnetic rod. Also, bottom side of coil becomes N pole and pull the S pole 93*b* of the magnetic rod. Then, the parts 91, 92, and 93 are raised against gravity.

Figure 12:
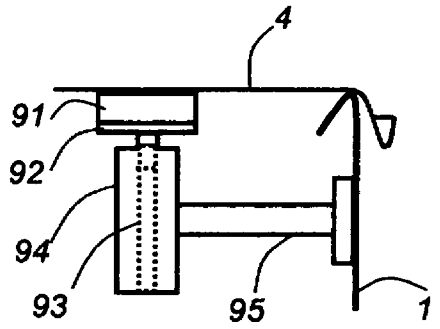
FIG. 12 shows touch status of muffling apparatus.
Figure 13:
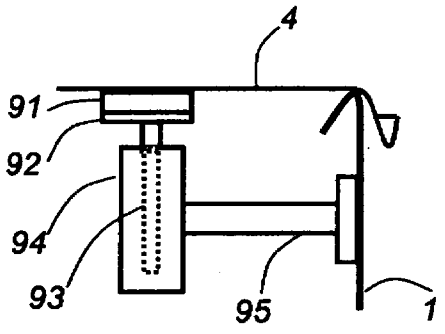
FIG. 13 shows press status of muffling apparatus.

When no electric current is given, felt pad 91 and plate 92 stay low position as shown in FIG. 9. Because felt 91 stays back from head 1, head vibration is not disturbed. We call this "open" status. When electric current is applied between 97-2 and 97-4, magnet rod 93 is pulled up to generated magnetic field. Then felt pad 91 touches to the head 1 as shown in FIG. 12. Because felt is soft, head vibration is possible but decays fast. This is used when performing hall has too much reverberation to reduce loudness and dump the sound faster. We call this "touch" status. When electric current is applied between 97-1 and 97-3, magnet rod 93 is pulled up to generated magnetic field, which is higher than former case. Felt pad 91 is pressed to the head as shown in FIG. 13. Then head vibration stops, no resonance occurs to the head. We call this "press" status.

Above described embodiment using magnetic field is one sample to realize the movement between three positions. Touch status is option. Equipment of two status, open and press, only is useful also, and easy to realize. On the contrary, there may be interpolated position between touch and press position, to produce different mute effects. Pedal, which has plural resolution, is used for this purpose. Furthermore, number of felt pads in touch or press status in every timpano may be changed.

Now, three categories of events activate the hardware described above. One is direct link to a muffling foot pedal. This pedal is other than pedal 29-1. During player push down the muffling pedal, felt pads of all timpani move to press status or intermediate status between touch and press, until player release the pedal. Second category of event is changing tone. While motor is driven to change the tone, felt pads of the timpano are moved to press status. This prevents unnecessary glissando sound.

Third category of event is programmed static muffling. For this purpose, display on the console panel 32 is modified as in FIG. 14. Modified points are addition of three letters at 98 and change in display of tone name of each timpani. In three letters at 98, "X" means press status, "x" means touch status, and "O" means open status. Player specifies touch or press status to the selected timpano by pressing "x" or "X" character 98 while editing each memory step. Default is open status. Timpani not selected keep same status. Tone display of timpano specified as touch status changes to having "x" mark as shown at 53-1. Also, for press status, display changes to have over written X as shown at 534. In play mode, as soon as step advances, electric current is applied to coil 96 of timpani specified as press or touch. In play mode, manual operation is also available to selected timpano by pressing any of characters at 98. These three modes work as OR. In other word, which gives greater pressure overrides others at each timpano.

Figure 14:
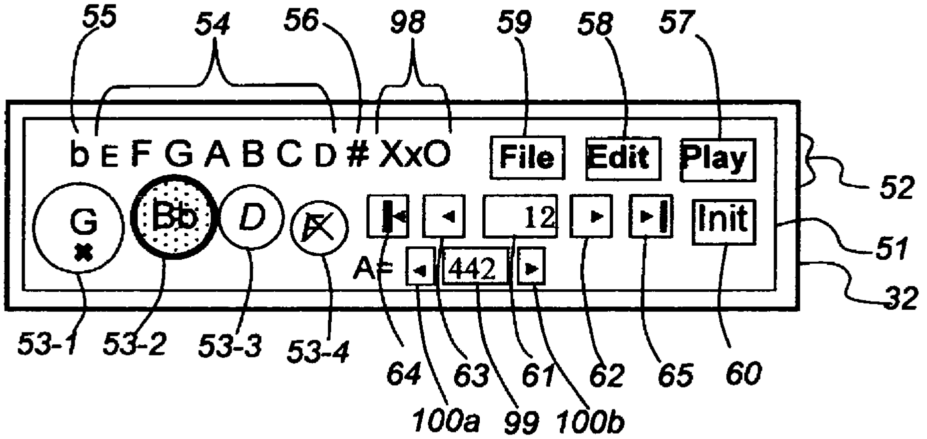
FIG. 14 is an example of console panel with muffling control.

In FIG. 14, pitch calibrating interface is shown. Number shown at window 99 represents current frequency of tone of A, to which every instrument to be tuned. And pseudo button 100*a* and 100*b* are used to decrement or increment the number. Each orchestra sets this frequency before playing. We call this frequency setting as calibration. With this embodiment, all possible periods of head vibration are memorized assuming frequency of A is 440 Hz. To compensate according to actual calibrated frequency, calibrated periods are calculated as original period multiplied by 440 and divided by calibrated frequency of tone A. This calculation is performed when there is change in calibration frequency. These calibrated frequency are used for the first transformation.

Player can set the calibration number at first. When tune of whole orchestra is detected as shifted later, player can adjust this number shown at the window 99 to make timpani tones match the orchestra pitch.

Figure 15:
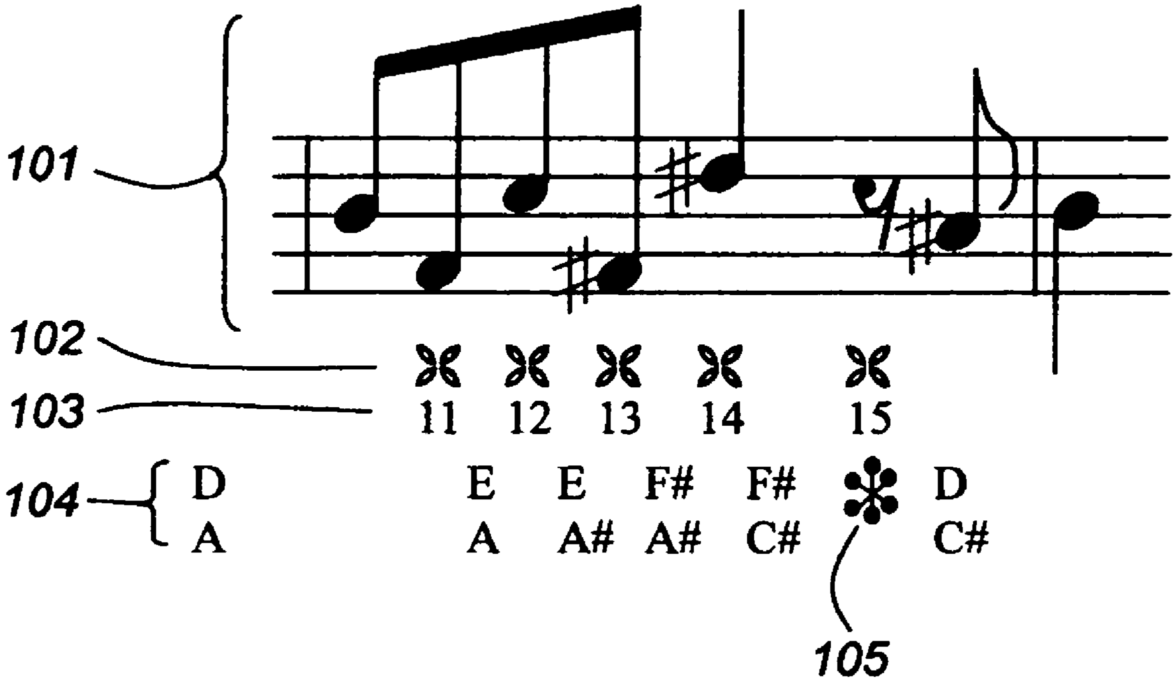
FIG. 15 is an example of music phrase with marks relating this invention.

FIG. 15 shows an example of a piece of music, which can be played by two timpani of this invention. Also, it shows how music sheet looks like with special marks related this invention. There are six different tones in this short phrase. So, with conventional timpani, and by not expert player, six timpani have to arrange around player without tuning changes. Expert player able to change tone of a timpano very quick during playing other timpano, may be able to play this phrase with four timpani, but it is challenging and critical. But, with two timpani of this invention, using programming function, it is rather easy for most timpani players.

In FIG. 15, notes and rest are written in staff notation 101, and five program step advance marks 102 are attached to them, with program step numbers 103 under the marks. Horizontal position of each mark is same as notes or rest in this example. This means that player steps on the foot pedal 29-1 in the same timing of hitting the head by hand. Alphabet characters 104 shows tones of two timpani after change in the program step completes.

Now parts of controller operation performed along with this example is described. When the controller receives the first signal from the foot pedal 29-1 at the mark of program step number 11, it drives felt pad 91 to press position to muffle the smaller timpano, which is sounding in D, and change tone from D to E. The bigger timpano stays in tone A and is hit and produce sound in A, at the same time. When change of tone completes, controller releases the felt pad 91 to original position, and waits next hit. Next steps are performed in same way. One more different kind mark 105 shows muffle timing. Player steps on two pedals; one for muffling and the other for program step advance in this example.

If there are four timpani of this invention, changes of program step can be reduced to two for this example piece. But, playing with two timpani is as easy as with four timpani.

Thus, with this invention, many music works can be played with less number of timpani. And this is advantage at narrow stage or orchestra pit, and is convenient for transportation. Also, this invention gives music composers wide freedom to use timpani, gives almost conceptual change to timpani.

Figure 16:
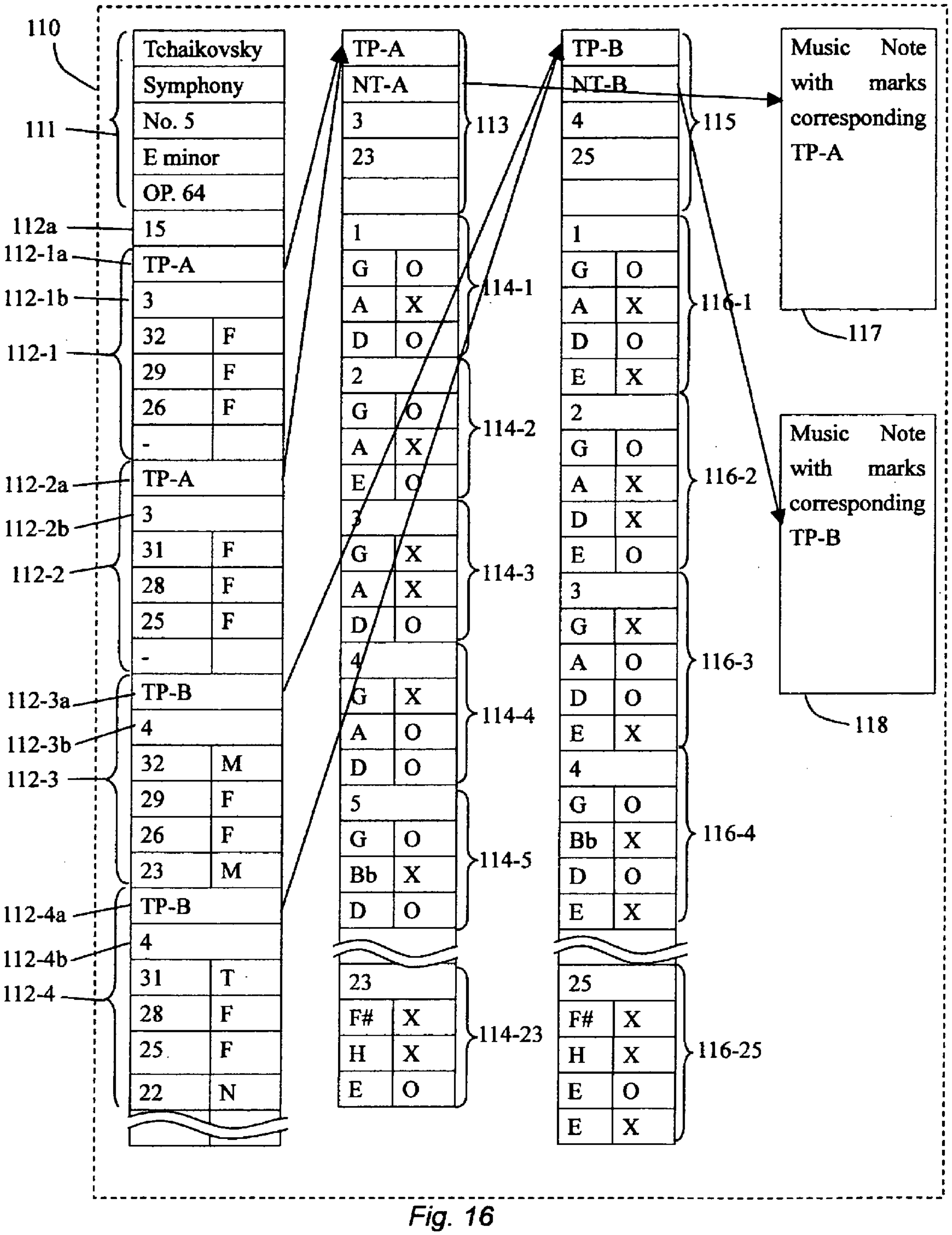
FIG. 16 is an example of a package of data in media for timpani to play a music work.

FIG. 16 shows example of structure and data for information on computer readable media, prepared for playing a music work with timpani of this invention. A package for one music work is shown as 110. It contains four kind of information; music work information 111, timpani set information 112, tuning program information 113-116, music note information 117-118.

Music work information contains identifying and describing information about the work, such as name of composer or arranger, type of music, serial number in the type, key or tonality, opus number and so on.

Timpani set information 112 contains many possible various set combinations of timpani about diameter, equipped or not with program tuning function and programmable muffling function. Also each combination has linkage to a tuning program usable with the timpani set. Number 112*a* shows how many set combinations are listed. Data in a parentice 112-1 includes information of one set combination, which are linkage to tuning program data 112-1*a*, number of timpani 112-1*b*, and property of each timpano, that are, diameter and equipped functions. In this figure, diameters are shown in inch. Letter F means full equipped, T means equipped with tuning program function but not muffling function, M means equipped with muffling function but not tuning program function, N means conventional timpani not equipped. 112-2~112-4 are information of other set combination. Further combinations are not shown.

Tuning program information consists of heading part 113 and program part 114. Heading part includes identification code, link to corresponding music note, number of timpani, and total step number. Program part includes description of each step consisting step number and tone and muffling setting for each timpano. In the figure Letter O means Open and X means Press status. Another information of tuning program is shown at 115 and 116, which is for case using four timpani set. Tone setting in 116-1, 116-2 and 116-3 are same but muffling setting are different. Further other information of tuning program are not shown.

Music notes corresponding each tuning program are included in the package. Special marks for tuning program step advance and muffling of this invention are filled into conventional music note. Player can use print out or view on display such as tablet computer.

Controller of timpani may show set combinations in the media on console panel, and player may choose one from the list. Or controller may read in the timpani set information and find out from the data a set matching with actual installed timpani set. And in both case the controller loads linked tuning program into tuning program memory.

In the figure, only one package 110 is shown, but one media may contain plural packages for different music works.

What is claimed is:

1. Timpano, which is capable of changing its tone automatically comprising:

a reversible motor linked to and driving a drive mechanism having a plurality of mechanical parts, which gives variable tension to a head;

an encoder for reading displacement of one of mechanical parts of said drive mechanism;

An operational panel to specify a tone to be tuned to;

a memory storing Curve Data comprising set of numbers defining a mathematical function representing a relation between values of said displacement against period or frequency of vibration of the head;

First Transformation unit for transforming said tone to be tuned to into a number representing frequency or period of head vibration;

Second Transformation unit for transforming said number representing period or frequency of head vibration into target value of said displacement, by using said mathematical function and reading said curve data from the memory;

Motor Drive unit driving said motor until the value of said displacement reaches said target value; and Tone Change unit being activated by input at said operational panel specifying tone to be tuned to and activating sequentially the First Transformation unit, the Second Transformation unit, and the Motor Drive unit Period measuring device to measure period or frequency of head vibration; vibration detector to detect that the head is hit and vibrating with an amplitude more than a predetermined level; tone adjust starting unit activating a Check unit when said vibration detector detects sound; Check unit for checking whether said period or frequency acquired from said period measuring device is in an allowance range from period or frequency already gotten by First Transformation unit, and activating following Updating Data unit when it is not in the allowance range; Updating Data unit for updating said Curve Data in the memory using new pair values of said displacement read from said mechanical part and said period or frequency acquired from said period measuring device, so that best fitness to said new and recent pairs of the displacement and period or frequency of vibration of the head is achieved by said mathematical function defined by said updated Curve Data and activating an Adjust driving unit; where said Adjust driving unit activates Second Transformation unit, and Motor Driving unit.

2. The timpano of claim 1, wherein said part is a hoop, which covers and pushes a rim of head, and said displacement is a vertical position of the hoop against a body of timpano encoded by a linear displacement encoder.

3. The timpano of claim 1, wherein said part is said motor, and said displacement is a cumulative rotational angle of the motor.

4. The timpano of claim 1, further comprising:

Period measuring device to measure period or frequency of head vibration;

Data Acquiring unit for activating Motor Drive unit with a plurality of predetermined plural displacements in available range, directing a player to hit the head, and taking in pair data of said displacement and value of period measuring device; and Calculating unit for calculating said Curve Data so that said mathematical function fits best to all of said taken pairs of data of said Data Acquiring unit, and storing the Curve Data into the memory.

5. The timpano of claim 1, wherein said Motor Drive unit is attached with Over Drive unit for driving motor until the value of said displacement reaches interim target displacement which is at predetermined distance from given target displacement to direction giving looser tension of the head, only in the case where driving reaches the target displacement loosens the head, where said Over Drive unit works before original Motor Drive unit described in claim 1.

6. A set of timpani, each of which is defined in claim 1, which is incorporated with:

a Timing Input device to input user operation indicating timing of tone change;

a memory for Tuning Sequence Data comprising plural step data, each of which are step number and combination of tones to be set for each timpano, in the sequence of necessity along performance; and Tuning Sequence Control unit activated when said Timing Input device inputs user indication of timing for advancing step number assigned to group data in said Tuning Sequence Data, reading out the combination of tones of current step number in said Tuning Sequence Data, and activating the First Transformation unit, the Second Transformation unit and the Motor Driving unit for each timpano which needs tone change.

7. The set of timpani of claim 6, which has a foot pedal as said Timing Input device.

8. The set of timpani of claim 6, which has one or plural touch pads as said Timing Input device.

9. The set of timpani of claim 6, which is further incorporated with:

Data Management unit for loading and saving said Tuning Sequence Data from and to a portable memory media or an outside computer.

10. The timpano of claim 1, which further has:

Two glissando buttons installed on a foot pedal to input the player's direct indication for raising or lowering the head tension and to drive the motor as indicated; and Means to control angle of the said foot pedal simultaneously with displacement of a hoop.

11. The timpano of claim 1, which further has:

Two glissando buttons to input the player's direct indication for raising or lowering the head tension and to drive the motor as indicated, in the way the glissando buttons sense multi level pressure to control motor speed.

12. The timpano of claim 1, which further has:

Two glissando buttons to input the player's direct indication for raising or lowering the head tension and to drive the motor as indicated;

Hold button to stop the motor and hold the head displacement;

Resume button to drive the motor toward the original displacement; and

Resume Displacement unit activated by depression of said resume button or detecting all buttons are not depressed after glissando button is released, and activating Motor Drive unit with a last output of Second Transformation unit.

13. Timpano, which of claim 1, which further has:

One or plural plates covered with soft pads with actuators to bring said plates to a head or remove said plates from the head, wherein said actuators take one of control positions, which are removed position, and plural positions where said plates apart from membrane with each different distances and said pads touch or press the head with different pressure; and a Selection tool to specify said control positions and let the timpani keep the position.

14. A set of timpani of claim 13, which is incorporated with;

a foot pedal for specifying momentary control positions for all timpani; and

Means to select input giving bigger pressure at the pads for each timpano from said Selection tool of each timpano and said foot pedal, to apply for said control position at each timpano.

15. A set of timpani of claim 13, which is incorporated with:

a Timing Input device to input user operation indicating timing of change of combination of said control positions;

a memory for Muffling Sequence Data comprising one or plural steps of combination of control positions of said actuators of plates for each timpano, in the sequence of necessity along performance; and Muffling Sequence Control unit, activated when receiving input from said Timing Input device for advancing step of said Muffling Sequence Data, reading out the combination of control positions of current step in said Muffling Sequence Data, and driving the actuators to the specified control positions.

16. Method for automatic tuning of timpano, wherein said timpano is incorporated with:

A reversible motor linked to and driving a drive mechanism, which gives variable tension to a head of the timpano;

An encoder for reading displacement of one of mechanical parts of said drive mechanism;

An operational panel to specify a tone to be tuned to; and

A memory storing Curve Data comprising set of numbers defining a mathematical function representing a relation between values of said displacement against period or frequency of vibration of the head, Period measuring device to measure period or frequency of head vibration; and Vibration detector to detect that the head is hit and is vibrating with an amplitude more than pre-determined level, and said method comprising two sequence of steps steps of:

first sequence steps starting when receiving input at said operational panel specifying tone to be tuned to;

First Transformation step for transforming said tone to be tuned to into a number representing frequency or period of head vibration;

Second Transformation step for transforming said number representing period or frequency of head vibration into target value of said displacement, by using said mathematical function defined by said curve data; and Motor Drive step for driving said motor until the value of said displacement reaches said target value; and a second sequence of steps starting when said vibration detector detecting head vibration: reading period or frequency of head vibration from said period measuring device and said encoder for displacement; checking whether period or frequency acquired in previous step is in an allowance range from period or frequency already calculated by the First Transformation step, and when period or frequency is not in the allowance range, updating said Curve Data using new pair values of said displacement and said period or frequency, so that best fitness to said new and recent pairs of the displacement and period or frequency of vibration of the head is achieved by said mathematical function defined by said updated Curve Data; repeat the Second Transformation step as in the first sequence; and repeat the Motor Drive step as in the first sequence.

17. Method for automatic tuning of timpano as defined in claim 16, wherein said timpano is further incorporated with:

Period measuring device to measure period or frequency of head vibration; and

Vibration detector to detect that head is hit and is vibrating with amplitude more than pre-determined level, and said method further comprising steps of:

driving said motor until the value of said displacement reaches one of predetermined plural displacement in available range;

directing a player to hit the head;

taking in pair data of said displacement and value of Period measuring device when the Vibration detector detects head vibration;

selecting other displacement and repeating above 3steps predetermined times;

calculating said Curve Data so that said mathematical function fit best to all of said taken pairs of data; and storing Curve Data calculated into the memory.

18. Method for automatic tuning of timpano as defined in claim 16, wherein said Motor Drive step has Over Drive step inseted before original Motor Drive step for driving motor until the value of said displacement reaches interim target displacement which is at predetermined distance from given target displacement to direction giving looser tension of the head only in the case where driving reaches the target displacement loosens the head.

19. Method for automatic tuning of a set of timpani as defined in claim 16, wherein said set is further incorporated with:

a Timing Input device to input user operation indicating timing of tone change; and a memory for storing Tuning Sequence Data comprising plural step data, which are step number and combination of tones to be set for each timpano of the set, in the sequence of necessity along performance, and said method further comprising steps of:

receiving input from said Timing Input Device;

advancing step number assigned to group data in said Tuning Sequence Data;

reading out the combination of tones of current step number in said Tuning Sequence Data; and going to the First Transformation step of claim 16 for each timpano which needs tone change.

20. Method for automatic tuning of a set of timpani as defined in claim 19 and media for the method including computer readable portable media, communication media and printed media, wherein said media are prepared for individual music composition work and have:

Timpani set information comprising one or plural groups of data, said group of data comprising number of timpani in a set, diameter or tunable tone range of each timpano in the set, and linkage to a Tuning Sequence Data; and One or plural Tuning Sequence Data usable for the music composition work with specified timpani set, and said method further comprising steps of:

Set Matching step for matching own set information with Timpani set information on the media and finding matched one group of data; and Loading Data step for loading Tuning Sequence Data linked from the group of data found in the Set Matching step.

21. Method for automatic tuning of a set of timpani as defined in claim 19 and media for the method including computer readable portable media, communication media and printed media, wherein contents of said media comprising:

Tuning Sequence Data; and

Music data for timpani part of a music composition work including marks, which show timing for player to operate on said Timing Input device, prepared corresponding to the Tuning Sequence Data, said method further comprising steps of:

loading Tuning Sequence Data from the media;

presenting the music data including said marks; and repetition of player's recognition of said mark and its timing relative to music beats and operation on Timing Input device.

22. Method for automatic tuning of a set of timpani as defined in claim 19, having further Method for muffling control, wherein each timpano in the set is further incorporated with:

One or plural plates covered with soft pads with actuators to bring said plates to a head or remove said plates from the head, wherein said actuators take one of control positions, which are removed position, and plural positions where said plates apart from membrane with each different distances and said pads touch or press the head with different pressure, and said memory further stores Tuning Sequence Data and combining Muffling Sequence Data comprising plural steps of combination of control positions of said actuators of plates for each timpano, in the sequence of necessity along performance; and and said method further comprising steps of:

reading out the combination of control positions of current step in said Tuning Sequence Data and Muffling Sequence Data; and driving said actuators to the specified control positions.

* * * * *